United States Patent [19]

Hudson

[11] 4,013,091

[45] Mar. 22, 1977

[54] FLOAT-CONTROLLED VALVE

[76] Inventor: George D. Hudson, 120 Hobbs Circle, Santa Paula, Calif. 93060

[22] Filed: Apr. 28, 1975

[21] Appl. No.: 572,194

[52] U.S. Cl. .............................. 137/414; 137/428; 137/433; 137/444; 251/46
[51] Int. Cl.² ........................................ F16K 31/18
[58] Field of Search .......... 137/414, 428, 429, 430, 137/432, 433, 437, 444, 451; 251/45, 46

[56] References Cited
UNITED STATES PATENTS

| | | | |
|---|---|---|---|
| 2,993,676 | 7/1961 | Dahl | 251/45 |
| 3,285,261 | 11/1966 | Chancey | 251/46 |
| 3,318,565 | 5/1967 | Cutler | 251/45 |
| 3,495,617 | 2/1970 | Zifferer | 137/433 |
| 3,893,475 | 7/1975 | Hudson | 137/444 |

*Primary Examiner*—Martin P. Schwadron
*Assistant Examiner*—G. L. Walton
*Attorney, Agent, or Firm*—Paul A. Weilein

[57] ABSTRACT

A control chamber of a float valve is formed in part by a diaphragm which is integral with an elastomeric main valve member that opens and closes the supply port of the float valve. A small tube to supply water to the control chamber is mounted in the main valve member and extends upward through and beyond the supply port. The upper end of the small tube tapers to an inlet opening that is sufficiently restricted to keep large solid particles out of the control chamber. The control chamber has a lower bleeder port which is controlled by a fixed upright pilot valve member on a float. A hood integral with the bottom wall of the control chamber extends downward to form a float chamber enclosing the float, the hood having ample vent ports for siphon prevention. Water is discharged from the bleeder port into an expansile chamber, the outlet of which is sufficiently restricted to cause the expansile chamber to depress the float thereby to increase the volume of water released on each float cycle.

9 Claims, 4 Drawing Figures

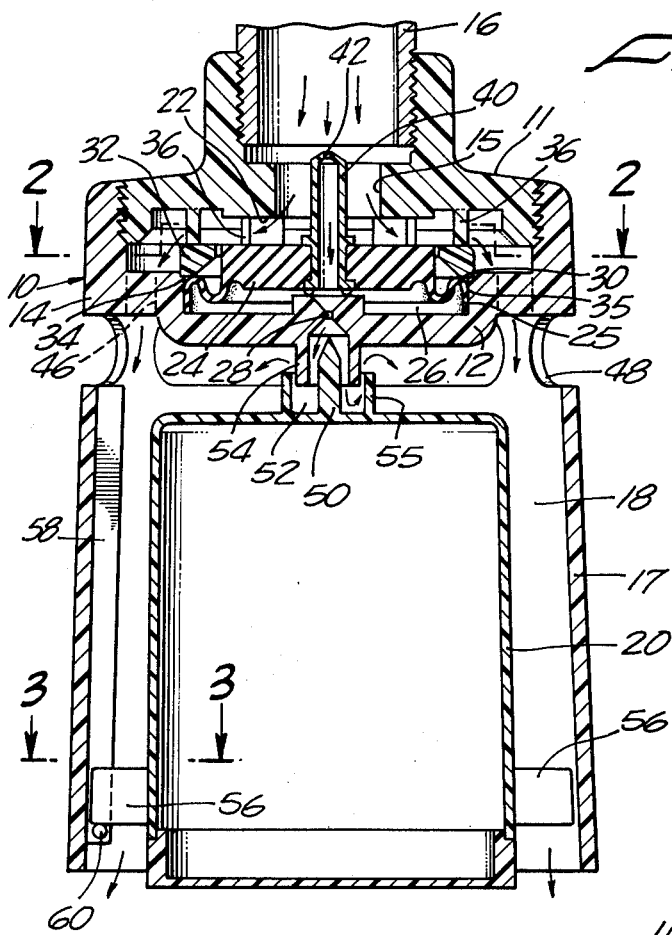
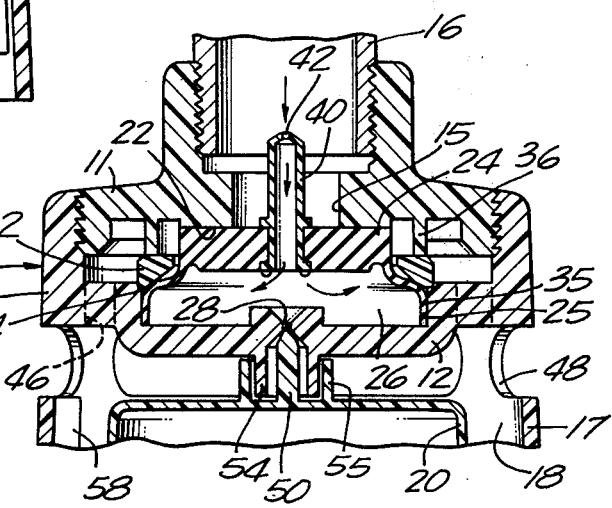
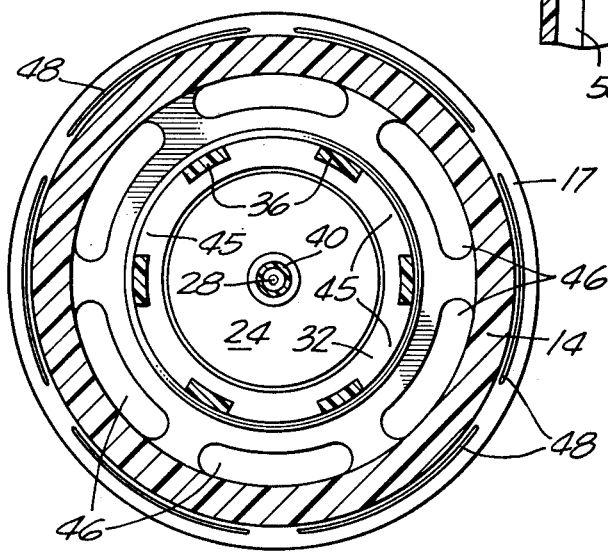

FLOAT-CONTROLLED VALVE

BACKGROUND OF THE INVENTION

This invention is directed to certain improvements in a float valve of the general character disclosed in my co-pending application entitled FLOAT VALVE, Ser. No. 403,814, filed Oct. 5, 1973, now U.S. Pat. No. 3,893,475, which patent is hereby incorporated into the present disclosure by reference.

In my prior disclosure, the valve casing has an upper supply port controlled by a main valve member and the casing has a rigid bottom wall with a hood extending downward therefrom to form a float chamber confining a float. A diaphragm carrying a main valve member cooperates with the bottom wall of the casing to form a control chamber. Rise in pressure in the control chamber closes the main valve member against the supply port and a drop in pressure retracts the main valve member to open position. Water pressure is supplied to the control chamber through a small conduit means in the form of an upright tube that is carried by the valve member and extends upward through and beyond the supply port.

To open the supply port, pressure is reduced in the control chamber by a bleeder port in the rigid bottom wall of the valve casing and the bleeder port is controlled by a small upright pilot valve member which is fixedly mounted on the upper side of the float. The pilot valve member is a simple pin which cooperates with a valve seat in the form of a small O-ring that is held in assembled position by a suitable annular retainer member.

The small tube projecting upward from the main valve member is slidingly embraced by a spider in the supply port and a screen carried by the spider keeps large sand particles out of the control chamber. The hood that extends downward from the control chamber has a vent which is sufficiently restricted to trap a body of air in the path of ascent of the float on each float cycle and thus cause the rise in liquid level inside the hood to lag behind the rise in liquid level outside the hood. The liquid level outside the hood must rise enough above the liquid level inside the hood to compress the trapped air sufficiently to permit the float to rise high enough to close the pilot valve. Thus, the trapped air has the effect of raising the normal level in the tank that is supplied by the float valve. The resulting increase in the volume of water that is released on each float cycle desirably decreases the frequency of the float cycle that is required to supply a given total volume of water over a given period of time.

SUMMARY OF THE INVENTION

One object of the present invention is to make the downwardly extending hood integral with the bottom wall of the casing so that the casing and hood may be economically molded of plastic or metal in one piece. A further object of the invention is to solve a problem created by the combined structure, which problem relates to the insertion of the float into the hood in the procedure of assembling the device. In my prior disclosure wherein the hood is separate from the valve casing, the float is inserted into the upper end of the separated hood and then the hood is attached to the valve casing, the float being captivated in the hood by fixed stop means on the interior of the hood.

If the hood is integral with the valve casing, however, the float must be inserted through the lower open end of the hood and some expedient is required that permits the float to be inserted through the open bottom of the hood but nevertheless thereafter captivates the float in the hood. Such an expedient may comprise a separate stop means which is installed in the hood after the float is inserted. A feature of the presently preferred practice of the invention, however, is the provision of a yieldable stop means integral with the hood which yields to permit the introduction of the float and thereafter is effective to retain the float inside the hood.

Another object of the invention is to simplify the construction of the pilot valve per se. For this purpose the previously mentioned O-ring of the bleeder port and the associated retainer are both omitted and the rigid pilot valve member on the float is tapered for effective control of the bleeder valve seat.

Still another object of the invention is to reduce the cost of the main valve member and the associated diaphragm as well as the means for retaining the diaphragm in its assembled position. In my prior disclosure the main valve member comprises two interconnected bodies and an elastomeric facing united therewith to seal the supply port, the two bodies being screwed together to grip the inner circumferential margin of an annular diaphragm. The outer circumferential margin of the annular diaphragm is clamped in a fluid-tight manner by a screw threaded retainer ring.

In the new construction the main valve member is a solid elastomeric body that is integral with the diaphragm and the diaphragm is so shaped that its outer circumferential margin is sealed by fluid pressure expansion against a surrounding cylindrical wall of the control chamber to eliminate the necessity for any screw threaded retaining ring. Thus, four components of the prior assembly, namely, the two bodies of the main valve member, the facing of the main valve member, and the diaphragm, are consolidated in one body and a fifth component of the prior assembly, namely, the screw threaded retaining ring is omitted without sacrificing effective sealing of the outer circumferential margin of the annular diaphragm.

The diaphragm in its retracted position is formed with a concentric fold and a plain ring, that overhangs the concentric fold to complete the captivation of the diaphragm, is held in place by a screw-threaded upper end wall of the valve casing.

A further object of the invention is to eliminate the necessity for the screen of my prior disclosure that is mounted on the guide spider to keep large solid particles from entering the upper end of the small conduit means or upright tube that is carried by the main valve member. In the new construction, the upper end of the small tube is tapered to a small inlet opening that is restricted to serve the purpose of the prior screen of holding back large solid particles. The tapered end of the small tube is flushed by water on each float cycle to remove any oversized solid particles that tend to clog the inlet opening. If the small inlet opening of the tube does become clogged, it is easily accessible either by unscrewing the valve casing from the supply pipe or by removing the screw threaded top wall of the casing that is formed with the supply port.

A further object of the invention is to provide means to depress the float on each float cycle to increase the volume of water released on each float cycle and at the same time to provide for freely venting the hood to prevent siphoning of the water back towards the water source. Restricting the venting of the hood to depress the float as taught by my prior disclosure precludes prevention of back siphoning. The object of the present invention, therefore, is to provide a new means for depressing the float that does not conflict with the desirability for freely venting the hood.

The new means for depressing the float takes advantage of the fact that water is continuously discharged from the bleeder port into the float chamber as long as replenishing flow occurs during a float cycle. The water discharges from the bleeder port through a chamber that is capable of expanding downward to depress the float and the outlet of the chamber is suitably restricted to cause the desired pressure rise in the expansile chamber.

In the presently preferred practice of the invention, the expansile chamber is formed by a first cylindrical skirt extending downward from the fixed bottom wall of the valve casing and a second cooperating cylindrical skirt that extends upward from the float and overlaps the first skirt. Thus, the two skirts variably telescope together and the radial clearance between the two skirts is sufficiently restricted to cause the desired rise in water pressure in the expansile chamber. As in my prior disclosure, the depression of the float on each float cycle increases the volume of replenishing flow on each float cycle and thereby reduces the number of float cycles required to release a given total volume of water over a given period of time.

The various features and advantages of the invention may be understood from the following detailed description and the accompanying drawings.

BRIEF DESCRIPTION OF THE DRAWING

In the drawing, which is to be regarded as merely illustrative:

FIG. 1 is a vertical sectional view of the presently preferred embodiment of the invention with the float valve opened;

FIG. 2 is a horizontal sectional view as seen along the line 2—2 of FIG. 1;

FIG. 3 is a fragmentary horizontal section as seen along the line 3—3 of FIG. 1; and FIG. 4 is a fragmentary sectional view similar to FIG. 1 showing the float valve closed.

DESCRIPTION OF THE PRESENTLY PREFERRED EMBODIMENT OF THE INVENTION

Referring to FIG. 1, the illustrated embodiment of the float valve includes a cylindrical valve casing, generally designated 10, having a top wall 11, a bottom wall 12, and a generally cylindrical peripheral wall 14. The top wall 11 is in the form of a removable screw-threaded cover and is formed with an axial supply port 15 which is screw-threadedly connected to a supply pipe 16 from a pressurized water source. Formed integrally with the bottom wall 12 and peripheral wall 14 of the casing is a downwardly extending open-bottom hood 17 that forms a float chamber 18 enclosing a hollow float 20. The valve casing 10, the hood 17, and the float 20 may be made of metal but are preferably made of suitable rigid plastic.

The supply port 15 is formed with a flat circular valve seat 22 for cooperation with a main valve member 24 which is shown in its normal closed position in FIG. 4 and is shown in its open position in FIG. 1.

The main valve member 24 is a solid body of a suitable elastomer and is integral with a downwardly extending diaphragm 25 in the form of a flared skirt. The main valve member 24 and the diaphragm 25 serve as a movable upper wall of a control chamber 26 that has a lower bleeder port 28. In the relaxed configuration of the diaphragm 25 shown in FIG. 1, the diaphragm is formed with a concentric fold 30 that disappears when the diaphragm is inflated by the pressure of water in the control chamber 26 as shown in FIG. 4.

Overhanging the concentric fold 30 is a plain concentric retaining ring 32 which captivates the diaphragm and for that purpose rests on an upper shoulder 34 of a rigid concentric wall 35 of the control chamber. The inner circumferential margin of the diaphragm 25 is sealed because it is integral with the main valve member 24 and the lower outer circumferential margin of the diaphragm is sealed by pressure against the concentric wall 35, the sealing pressure being created by the water in the control chamber. The retaining ring 32 is firmly seated against the upper shoulder 34 of the concentric wall 35 by a plurality of circumferentially spaced tongues 36 that project downward from the removable top wall 11 of the casing. Thus, screw threadedly tightening the top wall 11 effectively secures the retaining ring 32 in its assembled position.

Water is supplied to the control chamber 26 by a small conduit means in the form of an upright tube 40 that is incorporated in the main valve member 24 and at all times extends through and beyond the supply port 15. Thus, the inlet end of the small tube 40 is substantially spaced above the pressure drop and turbulence that occurs at the supply port 15 when the main valve member 24 is retracted to its open position.

The upper end of the small tube 40 tapers to form a small inlet opening 42 that is sufficiently restricted to serve as a screen to prevent solid particles above a given size from entering the control chamber. The tapered configuration of the upper end of the small tube 40 presents a conical surface to the inflowing water and any oversized particle that tends to clog the inlet opening 42 tends to be flushed down the conical surface to the exterior of the inlet tube.

When the main valve member 24 is retracted to its open position shown in FIG. 1, water from the supply pipe 16 enters the supply port 15 and flows radially outwardly through the spaces 45 (FIG. 2) between the downwardly extending tongues 36 and then is discharged downwardly into the float chamber 18 through a circumferentially spaced series of passages 46 (FIG. 2) that bypass the control chamber 26. A circumferential series of vent ports 48 in the hood 17 are ample to prevent the creation of a vacuum in the float chamber 18 and thus prevent backflow through the valve by siphon action in the event that a vacuum is created in the supply pipe 16 when the pressurized water source is inoperative.

Flow through the bleeder port 28 of the control chamber 26 is controlled by a pilot valve member in the form of a rigid tapered axial pin 50 that extends upward from the float 20. Surrounding the pilot valve member 50 is an expansile chamber 52 that is formed by a downwardly extending concentric skirt 54 of the bottom wall 12 of the valve casing in cooperation with a second upwardly extending concentric skirt 55 of the float 20, the two skirts overlapping in telescopic relation with an annular clearance between the two skirts. Water flowing downward from the bleeder port 28 is discharged into the float chamber 18 through the annular clearance between the two skirts 54 and 55 and a feature of the invention is that this annular clearance between the two skirts is sufficiently restricted to create relatively high pressure in the expansile chamber as long as the bleeder port is open. Thus, retraction of the pilot valve member 50 from the bleeder port 28 results in downward expansion of the expansile chamber 52 to depress the float 20 below a level that it would normally occupy in the water in the float chamber 18. The depression of the float 20 below its normal level reduces the frequency of the float cycles required to supply a given total amount of water in a given period of time.

The float 20 is guided both by the cooperating concentric skirts 54 and 55 at the upper end of the float and by a lower set of circumferentially spaced outer peripheral guide vanes 56 that are integral with the float.

The parallel vertical guide ribs 58 integral with the inner wall of the hood 17 straddle at least one of the guide vanes 56 and are formed with a pair of small confronting projections 60 (FIG. 3) that serve as stop means for the guide vane to limit the downward movement of the float 20 in the float chamber 18. The pair of projections 60, which may be formed by suitable embedded pins, are sufficiently closely spaced to serve their function as stop means but are sufficiently yieldable to permit the corresponding guide vane 56 to be forced upward past the projections with snap action in the procedure of installing the float 20 through the open bottom end of the hood 17. Making the hood 17 of plastic material makes the projections 60 yieldable to the desired degree.

The operation of the float valve may be readily understood from the foregoing description. The float valve is mounted in a tank of water with the vent ports 48 of the hood 17 above the level of the water. Normally, the float 20 by virtue of its buoyancy holds the pilot valve member 50 against the bleeder port 28 to cut off the float chamber 18 from the bleeder port. With pressurized water supplied to the control chamber 26 through the small upright tube 40 and with the bleeder port 28 closed, the pressure in the control chamber 26 maintains the main valve member 24 firmly in its closed position shown in FIG. 2. Whenever the float 20 lowers to retract the pilot valve member 50 from the bleeder port 28, water is released from the control chamber into the expansile chamber 52 and the consequent lowering of pressure in the control chamber permits the pressure of the supply water against the upper surface of the main valve member 24 to depress the valve member to its open position shown in FIG. 1. Replenishing water then flows into the float chamber 18 through the passages 46 to replenish the water in the surrounding tank.

As long as the pilot valve member 50 is retracted to its open position shown in FIG. 1, water continues to flow from the control chamber through the bleeder port 28 to cause the expansile chamber 52 to expand downward for depression of the float. When the water level in the surrounding tank rises high enough to terminate a float cycle by causing the pilot valve member 50 to close the bleeder port 28, pressure is restored in the control chamber 26 to force the main valve member 24 upward to its normal closed position. When consumption of water from the surrounding tank subsequently causes the water level to drop in the tank, the water level drops an appreciable distance before the pilot valve member 50 is retracted to initiate a new float cycle. It is this initial non-responsiveness of the float to the raising of the water level that accounts for the increase in replenishing flow that reduces the frequency of the float cycle.

My description in specific detail of the presently preferred embodiment of the invention will suggest various changes, substitutions and other departures from my disclosure within the spirit and scope of the appended claims.

I claim:

1. In a float valve for replenishing a body of liquid from a pressurized liquid source in response to drop in the level of the liquid body, wherein a control chamber is in communication with the pressurized source and has a movable wall to exert pressure to close a main valve to cut off the source from the liquid body and a pilot valve operated by a float controls the bleeder port in a fixed wall of the control chamber, and wherein a hood extending downward from said fixed wall of the control chamber forms a float chamber enclosing the float, the improvement comprising:
said fixed wall of the control chamber and said hood being formed in one piece thereby necessitating assembly of the float through the bottom of the hood; and
means inside the hood to limit downward movement of the float relative to the hood, said means to limit downward movement of the float comprising cooperative stop means on the float and the hood respectively, said stop means being yieldable to permit the float to be forced past the stop means in the assembly of the float valve.

2. In a float valve for replenishing a body of liquid from a pressurized liquid source in response to drop in the level of the liquid body, wherein the float valve has a casing and a supply passage from a pressurized liquid source terminates at a supply port of the casing and a generally cup-shaped control chamber is in communication with the supply passage and has a movable wall in the form of a diaphragm to exert pressure to close, a main valve member against the supply port to cut off the source from the liquid body and a pilot valve operated by a float opens and closes a bleeder port of the control chamber, the improvement comprising:
the main valve member being an elastomeric body and the diaphragm being a generally cup-shaped elastomeric extension of the body integral therewith around the periphery of the elastomeric body;
the outer circumferential margin of the diaphragm being surrounded by an inwardly facing circular wall of the control chamber;
whereby the outer circumferential margin of the diaphragm is held in sealing contact with the circular wall solely by the fluid pressure in the control chamber.

3. An improvement as set forth in claim 2 in which the diaphragm at its normal retracted position is formed with a concentric fold and a ring-shaped retaining member overhangs the concentric fold to captivate the diaphragm in said control chamber.

4. An improvement as set forth in claim 3 in which a portion of the casing is formed with said supply port;

in which said portion of the casing is in screw threaded engagement with the remainder of the casing;

and in which said portion of the casing is shaped and dimensioned to hold the retainer ring in assembled position by screw thread action.

5. In a float valve for replenishing a body of liquid from a pressurized liquid source in response to drop in the level of the liquid body, wherein a control chamber is in communication with the pressurized source and has a movable wall to exert pressure to close a main valve to cut off the source from the liquid body and a pilot valve operated by a float in a float chamber opens and closes a bleeder port in a fixed wall of the control chamber, and wherein said pilot valve includes a pilot valve member fixedly mounted on the float and movable therewith to engage or disengage a seat around said bleeder port to thereby close or open the bleeder port in response to rise and fall of the float, the improvement comprising:

means forming an expansile chamber enclosing said pilot valve member and capable of expanding downward to depress the float to increase the immersion of the float in the body of liquid to increase the volume of replenishing flow on each float cycle, said expansile chamber receiving the liquid discharged from the bleeder port and having an outlet to deliver the discharge to said body of liquid, said outlet of the expansile chamber being restricted to increase the pressure in the expansile chamber when the bleeder port is open.

6. An improvement as set forth in claim 5 in which said expansile chamber forming means are comprised in part by a first structure extending downward from said fixed wall of the control chamber and is formed in part by a second structure extending upward from the float in overlapping relation to the first structure.

7. An improvement as set forth in claim 5, wherein a hood united with said fixed wall of the control chamber extends downward therefrom and forms a float chamber surrounding the float, said hood having at least one aperture therein venting the float chamber to the atmosphere, the flow capacity of said aperture being sufficient to prevent reverse flow from said body of liquid to said source by siphon action.

8. An improvement as set forth in claim 7 in which said fixed wall of the control chamber and said hood are formed in one piece thereby necessitating insertion of the float through the bottom of the hood in the assembly of the float valve;

and which includes means inside the hood to limit downward movement of the assembled float relative to the hood, said means to limit downward movement of the float comprising cooperative stop means on the float and the hood respectively, said stop means being yieldable to permit the float to be forced upward past the stop means with snap action in the assembly of the float valve.

9. An improvement as set forth in claim 6 in which said first structure is a cylindrical portion of the bottom wall of the control chamber and said second structure is a cylindrical portion of the float, the radial clearance between the two cylindrical portions forming the outlet of the expansile chamber.

* * * * *